(12) United States Patent
Kinnunen

(10) Patent No.: US 10,012,027 B2
(45) Date of Patent: Jul. 3, 2018

(54) HOSE RELEASE DEVICE, ROCK DRILLING UNIT AND METHOD OF MANAGING HOSES

(71) Applicant: SANDVIK MINING AND CONSTRUCTION OY, Tampere (FI)

(72) Inventor: Jouni Kinnunen, Tampere (FI)

(73) Assignee: SANDVIK MINING AND CONSTRUCTION OY, Tampere (FI)

(*) Notice: Subject to any disclaimer, the term of this patent is extended or adjusted under 35 U.S.C. 154(b) by 631 days.

(21) Appl. No.: 14/645,142

(22) Filed: Mar. 11, 2015

(65) Prior Publication Data
US 2015/0260314 A1   Sep. 17, 2015

(30) Foreign Application Priority Data

Mar. 12, 2014   (EP) .................... 14159157

(51) Int. Cl.
*E21B 7/00* (2006.01)
*E21B 7/02* (2006.01)
*E02F 9/22* (2006.01)
*E21B 1/02* (2006.01)
*F16L 3/01* (2006.01)

(52) U.S. Cl.
CPC ............ *E21B 7/025* (2013.01); *E02F 9/2275* (2013.01); *E21B 1/02* (2013.01); *F16L 3/01* (2013.01)

(58) Field of Classification Search
CPC .................................. E21B 1/01; E21B 7/025
See application file for complete search history.

(56) References Cited

U.S. PATENT DOCUMENTS

| 3,776,403 A | 12/1973 | Billings |
| 4,384,619 A | 5/1983 | Schuck |
| 2006/0120892 A1* | 6/2006 | Muona ............... E21B 44/06 417/375 |
| 2011/0132862 A1 | 6/2011 | Wimmer |
| 2015/0260314 A1 | 9/2015 | Kinnunen |

FOREIGN PATENT DOCUMENTS

| DE | 4007470 C1 | 3/1991 |
| JP | 61-142797 | 9/1986 |
| JP | 8-285149 | 11/1996 |
| JP | 10-318446 | 12/1998 |

* cited by examiner

*Primary Examiner* — D. Andrews
(74) *Attorney, Agent, or Firm* — Corinne R. Gorski

(57) ABSTRACT

A hose release device allowing a length change of a pressure medium hose caused by expansion under high pressure is provided. A method of managing hoses and executing a deflection to the hose so that extra length is reserved in the system incorporates such a hose release device.

9 Claims, 4 Drawing Sheets

P1, D1 < P2, D2

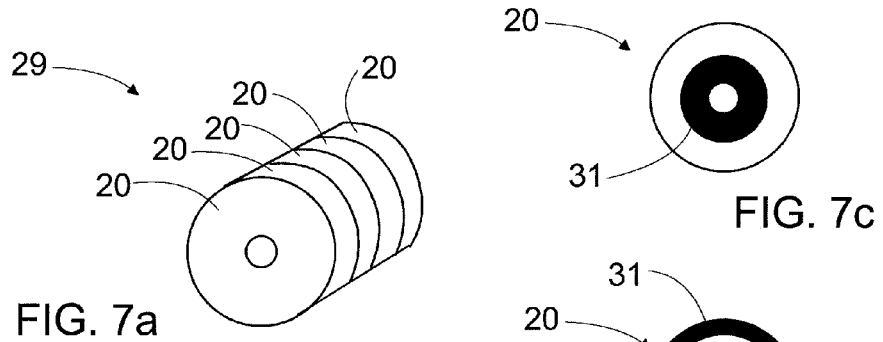
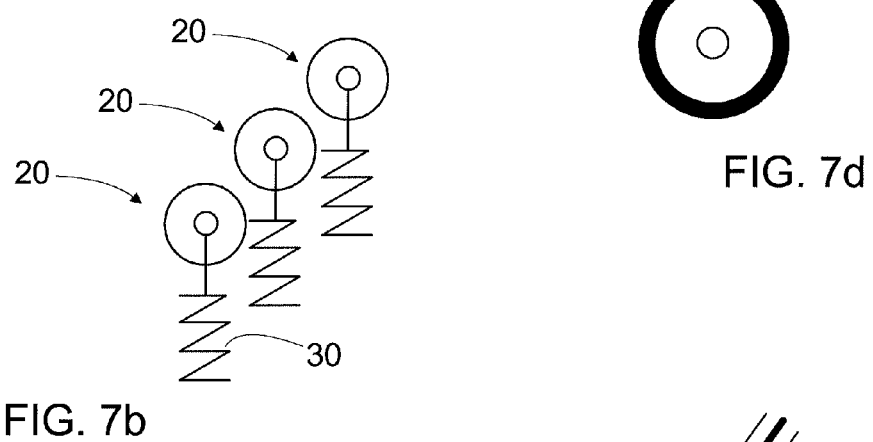
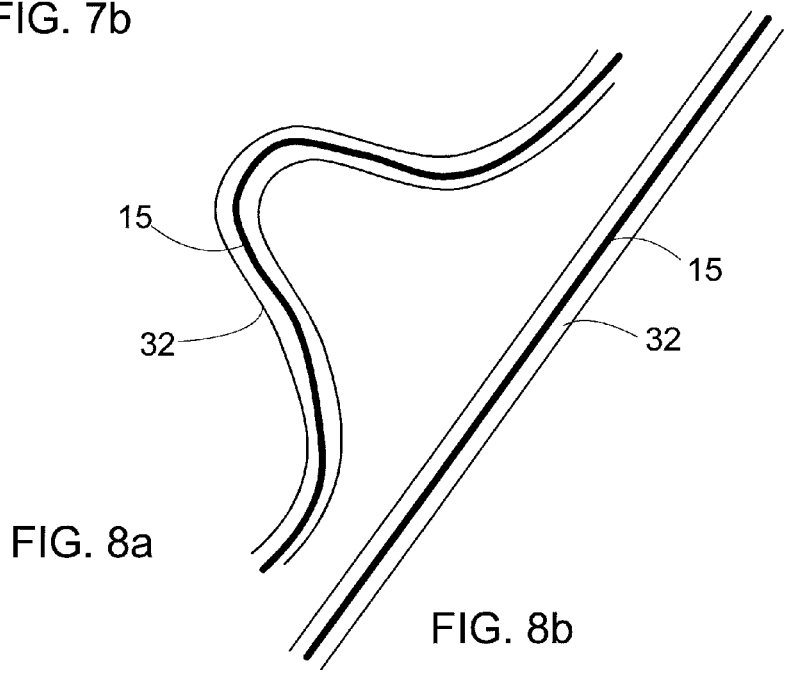

US 10,012,027 B2

HOSE RELEASE DEVICE, ROCK DRILLING UNIT AND METHOD OF MANAGING HOSES

RELATED APPLICATION DATA

This application claims priority under 35 U.S.C. § 119 to EP Patent Application No. 14159157.8, filed on Mar. 12, 2014, which the entirety thereof is incorporated herein by reference.

TECHNICAL FIELD

The present disclosure relates to a hose release device for supporting one or more pressure medium hoses, a hose arrangement, a rock drilling unit and a method of managing pressure medium hoses.

BACKGROUND

In mines and at other work sites, rock drilling units are used for drilling bore holes into rock surfaces and soil. The rock drilling unit comprises a feed beam and a rock drilling machine arranged movably on it. The rock drilling machine comprises hydraulic actuators such as a rotating device and a percussion device. Hydraulic power is conveyed to the hydraulic actuators by means of hydraulic hoses, which are supported by guide rolls or corresponding support means. However, it has been noted that the present supports means are not sufficient and have some defects.

SUMMARY

The hose release device according to the disclosure is includes at least one support surface for supporting at least one pressure medium hose, the at least one support surface having an initial position and a movement range allowing movement away from the initial position. At least one force member generates a support force for maintaining the support surface in the initial position. The support surface is allowed to be moved away from the initial position when a force is directed to the support surface from the at least one hose. The hose release device is a protecting device that allows length compensation when length of the supported pressure medium hose is shortened due to expansion of an outer diameter of the pressure medium hose caused by high pressure prevailing inside the hose.

The hose arrangement includes at least one pressure medium hose arranged between a first fastening point and second fastening point. The hose is led around at least one guide roll. At least one hose release device is located between the first fastening point and the guide roll. The hose release device deflects, in the initial position, the hose in a transverse direction from a shortest line between the first fastening point and the guide roll.

The rock drilling unit is located between at least one of the hose clamps and the guide roll. The hose release device deflects, in the initial position, the hydraulic hose in transverse direction from a shortest line between the hose clamp and the guide roll.

The method according to the disclosure includes implementing at least one hose release; deflecting the at least one pressure medium hose from a shortest straight distance between the supporting objects by the at least one hose release device; and allowing the hose to move towards the straight line when the hose is pressurized and its length is decreased due to the pressurization.

An aspect of the disclosed solution is that one or more hose release devices are arranged to support one or more hoses of a pressure medium system. The hose release device includes at least one support surface for supporting the pressure medium hose. The support surface has an initial position and it may move away from the initial position when a force is directed to the support surface from the hose. The hose release device also includes one or more force members for generating a support force for maintaining the support surface in the initial position. Further, the hose release device is a protecting device dedicated to allow length compensation when length of the supported pressure medium hose is shortened due expansion of an outer diameter of the hose caused by high pressure prevailing inside the hose.

Another aspect of the disclosed solution is that the hose release device may serve as a preventive component in a pressure medium system. When a great tensioning force is directed to the hose, the hose release device may decrease the tensioning force by moving the support surface. Due to the releasing effect, damages to the supported hose may be prevented. Furthermore, extensive loadings directed to other components of the pressure medium system and guide elements of the hoses may be avoided.

According to an embodiment, the hose release device is utilized in a pressure medium system for supporting one or more working pressure hoses. The working pressure hoses are utilized for transferring needed working energy and force to a pressure medium actuator. In the working pressure hoses may exist at high pressures.

According to an embodiment, the hose release device is utilized in a hydraulic system for supporting one or more hydraulic hoses. The solution disclosed in this patent application is particularly advantageous in hydraulic systems since greater pressures and expansions exist in hydraulic hoses. However, in some cases a need for the disclosed solutions may also arise in pneumatic systems.

According to an embodiment, the at least one force member is a spring. A mechanical spring is simple, durable and inexpensive component.

According to an embodiment, the at least one force member is a leaf spring.

According to an embodiment, the at least one force member is a coil spring.

According to an embodiment, the at least one force member is a resilient element, which may be made of, for example, rubber or elastic plastic material. One possible material for the resilient element is polyurethane.

According to an embodiment, the at least one force member is a resilient strap or string, which may be arranged to generate a pull force for one or more hoses in an initial position of the release device in order to deflect the hoses from their natural line.

According to an embodiment, the at least one force member is an actuator, such as a pneumatic cylinder or bellow. The actuator may serve as a passive spring element, or alternatively, the actuator may be controlled by controlling feed and discharge of pressure medium.

According to an embodiment, the support force of the force member is directed in a transverse direction relative to a longitudinal axis of the hose being supported. Thus, the hose release device allows the hose to be moved in the transverse direction when it is subjected to high tension load. The support surface or element of the release device may move in the transverse direction and may then produce transverse release effect. The supported one or more hoses may be deflected by the hose release device in an initial position, and the release device allows the hose to straighten when being tensioned.

According to an embodiment, the hose release device is configured to deflect one or more hoses from a shortest straight line between guide rolls or corresponding supporting surfaces or objects by means of the hose release device. When the hose is pressurized and its length is decreased due to the pressurization, the release device will execute release function and allow the hose to move towards the shortest straight line. The release device may reserve hose length and may release it when needed.

According to an embodiment, the support force of the force member is directed in a longitudinal direction of the hose being supported. The hose release device permits the hose to move in the longitudinal direction. The movement serves as a longitudinal release effect. The release device may be integrated with a structure of a hose coupling. Alternatively, the release device may be a separate component arranged between two hose parts and may include two or more nested parts, which may slide relative to each other in the longitudinal direction. In an additional embodiment, the release device may include a coupling box where the hydraulic hose is connected and which coupling box may slide longitudinally and may thus cause the desired release effect.

According to an embodiment, the hose release device may affect only one single hose. Thus, the hose release device includes one support surface for supporting one hose.

According to an embodiment, the hose release device may affect several hoses. Thus, the hose release device includes several support surfaces for supporting the hoses.

According to an embodiment, the hose release device includes a body and one or more longitudinal arms protruding from the body. A distal end portion of an arm(s) is provided with one or more connecting elements for connecting the hose to the arm. The distal end portion of the arm serves as a support surface for the hose. The longitudinal arm serves as a leaf spring and is arranged to bend relative to the body when a force is directed to it. The bending of the arm generates a release effect. Due to the bending of the one or more longitudinal arms, the structure of the hose release device may be simple and no separate pieces with pivotal coupling are needed. Since the longitudinal arm serves as a leaf spring, the structure may be without any separate force members.

According to an embodiment, a longitudinal axis of the arm is in an initial angle position relative to the body. When a force is directed from a hose to the arm, the arm bends and as a consequence of that, the initial angle decreases. Since the arm is in the initial angular position, the arm may deflect the hose from its natural route, whereby the structure reserves hose length and releases it when needed. The arm being in the initial angle position also serves as a force member for generating a support force for resisting the bending and maintaining a support surface of the arm in the initial position.

Furthermore, the hose release device has plate-like configuration. The plate like structure is easy to manufacture, simple, durable and inexpensive.

According to an embodiment, the hose release device is a plate-like object including a body and one or more longitudinal arms protruding from the body. The body and the one or more arms are one integrated unity. The hose release device may be formed of one single plate element, whereby the structure is very simple.

According to an embodiment, the hose release device is a plate-like object comprising a body and one or more longitudinal arms protruding from the body. The support force of the arm is defined by a cross-sectional dimension of the arm and a distance between the body and the connecting element. Thus, support properties of the arm may be affected by choosing thickness and strength of the plate material, and width and length of the arm. The disclosed plate-like hose release device may be formed by cutting and bending techniques, whereby the manufacture is cost-effective and allows easily modifications to the structure. A preform of the hose release device may be flame cut, plasma cut or laser cut, and the preform may be bent in a pressing machine to a desired angle.

According to an embodiment, the includes several parallel arms. The adjacent arms may be similar. Alternatively the adjacent arms may have a different length, width and bending angle, for example, whereby they may have different release ability. Since the release device has a plate-like structure, it is relatively simple to modify the arms on a case-by-case basis.

According to an embodiment, at a distal end portion of the arm is a flexible strap serving as a connecting element. The flexible strap may be arranged around the hose for tying the hose to the arm. At its simplest, the flexible strap may be a plastic cable tie. Alternatively, any other tying straps provided with a locking mechanism may be used. This embodiment provides an easy and inexpensive, but still reliable solution for connecting the hose to the release device.

According to an embodiment, at the distal end portion of the arm is a guiding element for keeping the arm and the hose aligned.

According to an embodiment, the hose release device is arranged in connection with a hose clamping device. The hose clamping device is designed to fasten the one or more hoses to an object. The embodiments simplify the structure, since same fastening elements may be used for the hose release device and the clamping device.

According to an embodiment, the hose release device includes one or more rolls having an outer periphery. The outer periphery of the roll serves as a support surface in the release device. At least one force member is arranged to keep the roll in an initial position, and the roll is allowed to be moved towards a second position when subjected to a force directed from the hose to the support force.

According to an embodiment, the outer peripheries of the rolls may serve as support surfaces for the hoses. Structure of the roll may include at least one portion made of resilient material, which compresses when a force greater than the support force is directed to the roll. The outer periphery of the roll may be of resilient material. Alternatively, the roll is supported by an axle and the roll includes a ring-shaped outer portion and inner portion. The inner portion may be of resilient material, whereby it may provide the release device with the desired release effect.

According to an embodiment, the hose release device includes at least one tubular element through which the hose is arranged. The tubular element is of a flexible material and has a bent initial form. The bent tubular element is arranged to straighten when tension force is formed to the hose. The straightening of the tubular element and the supported hose executes the desired release effect. The tubular element may be made of plastic material, rubber or it may also be metallic material.

According to an embodiment, the hose release device includes a slide mechanism allowing linear movement in the longitudinal direction of the hose.

The above-disclosed embodiments can be combined to form desired solutions provided with necessary features disclosed.

The foregoing summary, as well as the following detailed description of the embodiments, will be better understood when read in conjunction with the appended drawings. It should be understood that the embodiments depicted are not limited to the precise arrangements and instrumentalities shown.

BRIEF DESCRIPTION OF THE FIGURES

FIG. 7a is a schematic view of a roll assembly provided with several rolls.

FIG. 7b is a schematic view of spring supported rolls of a roll assembly.

FIGS. 7c and 7d are schematic views of rolls of a hose release device, wherein the rolls are provided with annular sections made of resilient material.

FIGS. 8a and 8b are schematic views of a tubular hose release device through which the hose is arranged.

For the sake of clarity, the Figures show some embodiments of the disclosed solution in a simplified manner. In the Figures, like reference numerals identify like elements.

DETAILED DESCRIPTION

Figure 1:
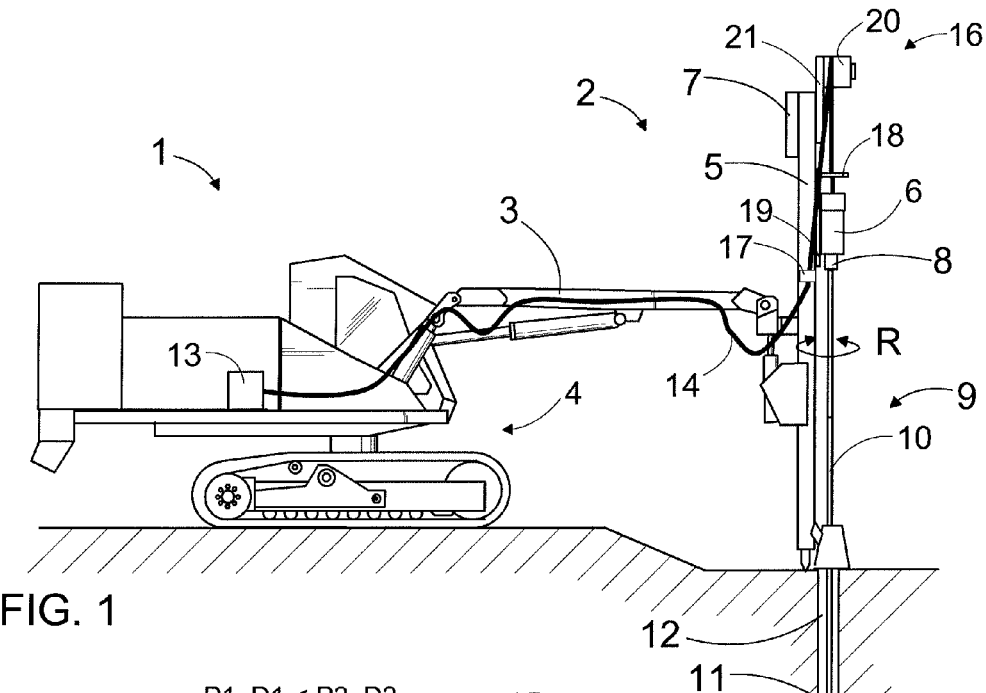
FIG. 1 is a side view of a rock drilling rig provided with a drilling unit.

FIG. 1 shows a rock drilling rig 1, including a rock drilling unit 2, which may be connected by a boom 3 to a movable carrier 4. The drilling unit 2 may include a feed beam 5 and a rock drilling machine 6 supported on it. The rock drilling machine 6 may be moved on the feed beam 5 by a feed device 7. The rock drilling machine 6 includes a shank 8 at a front end of the rock drilling machine 6 for connecting a tool 9. The tool 9 may have one or more drill rods 10 and a drill bit 11 located at a distal end of the tool 9.

The rock drilling machine 6 further includes a rotating device for rotating the shank 8 and the tool 9 connected to the shank 8. When the rock drilling is based on rotation R and feed of the tool, then the drilling is known as rotary drilling. However, the rock drilling machine 6 may also include an impact device or percussion device for generating impact pulses to the tool 9. At a drilling site, one or more drill holes 12 are drilled with the drilling unit 2.

The rock drilling machine 6 may have one or more hydraulic actuators. The percussion device and the rotation device may be hydraulic actuators. Hydraulic power may be generated in a hydraulic pumping unit 13, which may be located on the carrier 4. The hydraulic power may be transmitted by one or more hydraulic hoses 15 to the rock drilling machine 6. Since the rock drilling machine 6 is moved on the feed beam 5 in a drilling direction and reverse direction, the hose 14 is supported on the feed beam 5 by a hose support system 16, which allows the movements of the rock drilling machine 6.

The hose support system 16 may include a first hose clamp 17 connected to the feed beam 5 and a second hose clamp 18 arranged in connection with the rock drilling machine 6. The second hose clamp 18 may be arranged directly on the rock drilling machine 6 or it may arranged on a cradle 19 or any other mounting base or frame between the rock drilling machine 6 and the feed beam 5.

The hose support system 16 may further include one or more guide rolls 20 arranged movably relative to the feed beam 5. The guide roll 20 may be located at a distal end of the feed beam 5 and may have a slide 21 or corresponding mechanism allowing the guide roll 20 to move in the longitudinal direction of the feed beam 5 in response to the feed movement of the rock drilling machine 6.

The rock drilling unit 2 may be provided with one or more hose release devices disclosed above and shown in FIGS. 3a-10. The hose release device may be located between the first hose clamp 17 and the guide roll 20, between the guide roll 20 and the second hose clamp 18, in connection with the guide roll 20, or in connection with either of the hose clamps 17 and 18, for example.

Figures 2A, 2B:
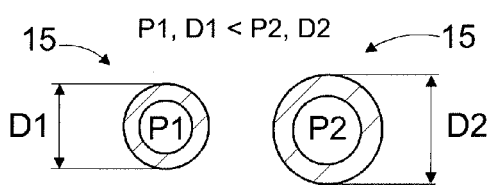
FIG. 2a is a cross-sectional view of a pressure medium hose when subjected to low pressure.
FIG. 2b shows the hose when high pressure is acting inside the hose.

FIG. 2a discloses a hydraulic hose 15 inside which low hydraulic pressure P1 is acting. An outer diameter D1 of the hydraulic hose 15 is in initial dimension. When the hydraulic hose 15 is pressurized with high hydraulic pressure P2, the outer dimension D2 expands as is shown in FIG. 2b. Variations in the outer dimensions of the hydraulic hose 15 may cause changes in the length of the hose 15, when the hose 15 is supported by the hose support system. The hose release device of the present disclosure provides solutions for the length change problems faced by the hydraulic hoses 15.

Figures 3A, 3B:
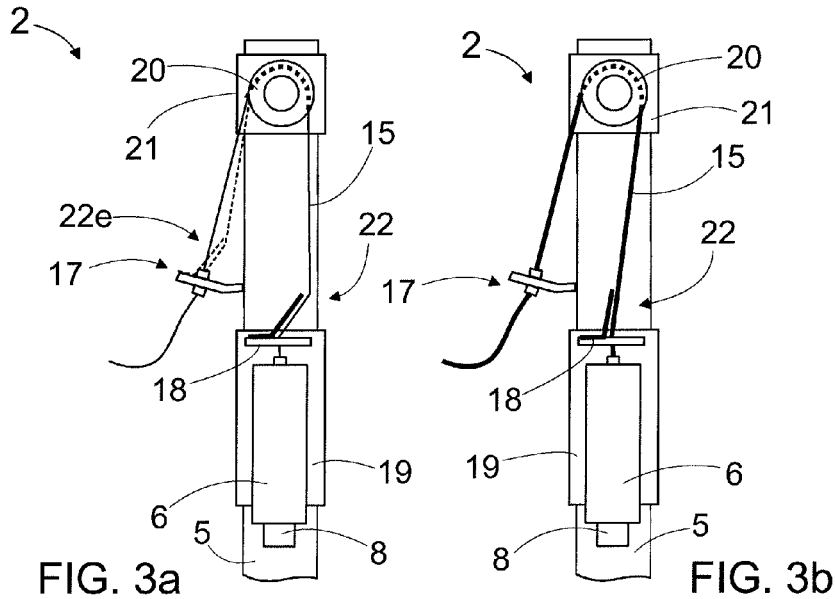
FIG. 3a is a schematic top view of a rock drilling unit provided with a hose release device, which is in an initial position, and in FIG. 3b the same release device is in a release position.

FIGS. 3a and 3b show a principle of a hose release device 22. In FIG. 3a the hose release device 22 is in an initial position, wherein a support surface of the device deflects the hydraulic hose 15 between a guide roll 20 and a second hose clamp 18, so that extra length of the hose is accumulated between them. In FIG. 3b the hose 15 is pressurized and the hose 15 is expanded causing the length to shorten, the hose release device 22 is bent away from the initial position and the deflecting feature is decreased or totally removed causing release affect for the hose 15, and the hose moves towards the shortest straight line between the guide roll 20 and the second hose clamp 18. In FIGS. 3a and 3b the hose release device 22 acts in a transverse direction relative to a longitudinal axis of the hydraulic hose 15. The structure of the hose release device 15 may be in accordance with FIGS. 4 and 5, which are described further herein.

FIG. 3a discloses an alternative position for a hose release device 22e. The hose release device 22e may be arranged in connection with a first hose clamp 17 and it operates in a similar manner as the device 22.

Figure 4:
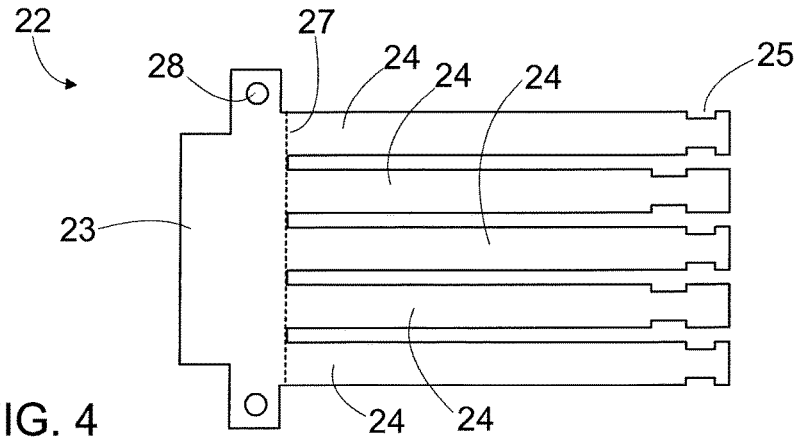
FIG. 4 is a schematic view of a hose release device provided with several arms.
Figure 5:
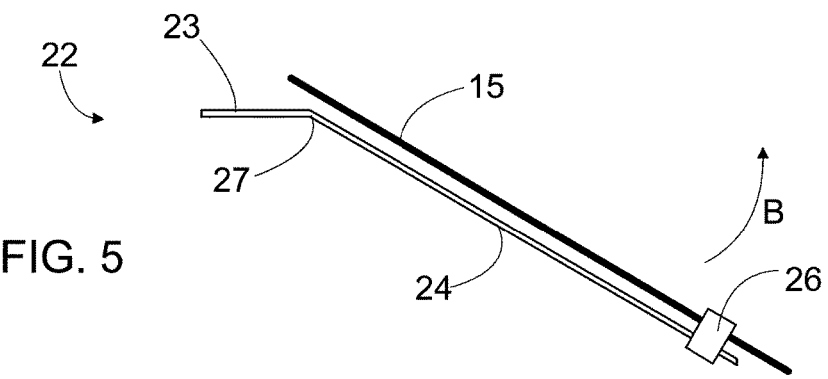
FIG. 5 is a schematic view showing operation of a bendable arm of a hose release device.

FIG. 4 discloses a hose release device 22 including a body 23 and several elongated arms 24 protruding from the body part. In FIG. 4 there are five arms 24, but the amount of arms may be 1 to 6, for example. At a distal portion of the arm 24 there may be notches 25 or other fastening portions allowing mounting of a connecting element 26, which is shown in FIG. 5. A hydraulic hose 15 may be connected to the arm 24 by the connecting element 26.

As can be seen in FIG. 5, the structure of the release device 22 may be plate-like. FIG. 5 also discloses that the arm 24 may be bent to an initial angular position relative to the body 23. A bend line 27 of the arms is shown in FIGS. 4 and 5. When the hose 15 is pressurized with high pressure, the arm 24 may bend (B) away from the initial position.

FIG. 4 further discloses fastening holes 28 allowing the release device 22 to be fastened by means of fastening bolts, for example. The fastening holes 28 may be designed so that the release device 22 may be fastened using the same fastening bolts as a hose clamp.

Figure 6:
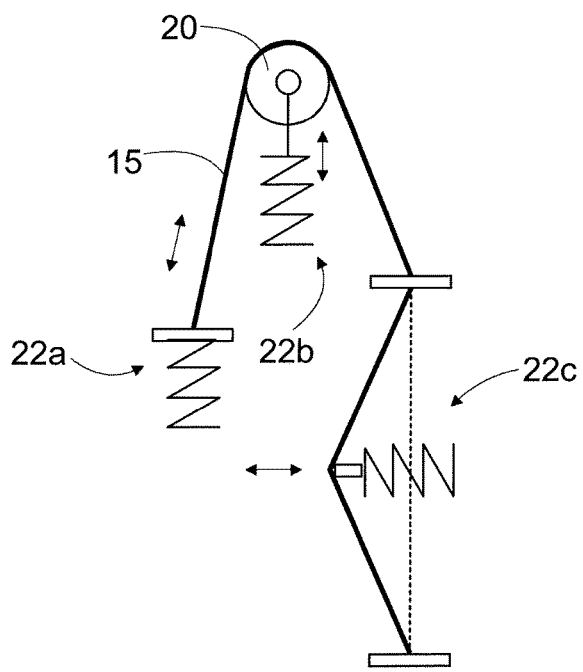
FIG. 6 is a schematic view showing principles of several feasible hose release mechanisms.

FIG. 6 is a simplified presentation showing basic principles of some hose release mechanisms according to the present disclosure. A release device 22a may produce a release effect in a longitudinal direction of the hose 15. A release device 22b may be arranged in connection with the guide roll assembly and may also produce a longitudinal release effect. A release device 22c causes a deflection to the hose 15 and thus affects the hose 15 in a transverse direction. One single release device, or alternatively a combination of two or more release devices may be implemented.

FIG. 7a discloses a roll assembly 29 provided with several rolls 20, which may be supported by spring elements 30 shown in FIG. 7b. The roll assembly may then serve as a release device 22b shown in FIG. 6.

FIGS. 7c and 7d disclose rolls 20 of a hose release device 22b, wherein the rolls 20 are provided with annular sections 31 made of resilient material. The sections 31 made of the resilient material may compress and thereby cause desired release effect for the hose being supported by means of the rolls 20.

FIGS. 8a and 8b disclose a tubular element 32, which may serve as a hose release device 22. A hose 15 may be arranged through the tubular element 32, which may be made of flexible material. In FIG. 8a, the tubular element 32 is in an initial curved position and in FIG. 8b, the shape of the tubular element 32 has been straightened due tension forces acting in the hose 15.

Figure 9:
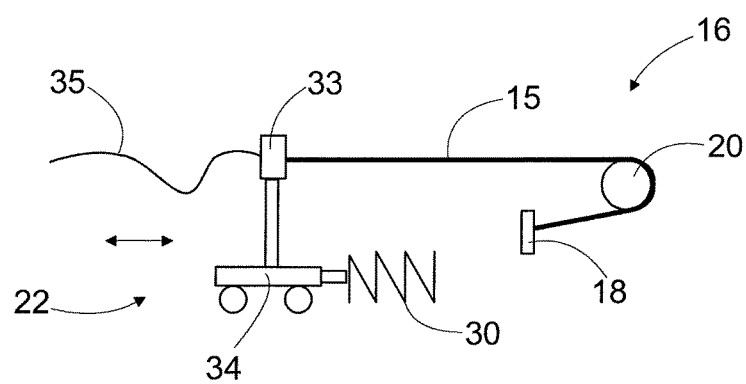
FIG. 9 is a schematic view of a hose connecting element such as a coupling box, which may slide in a longitudinal direction of the hose.

FIG. 9 discloses a hose connecting element, such as a coupling box 33, which may be arranged on a slide 34 and may move in a longitudinal direction of a hose 15. The disclosed hose release device 22 is kept in an initial position by a spring element 30. The movable coupling box 33 may be located between two hose parts 35 and 15.

Figure 10:
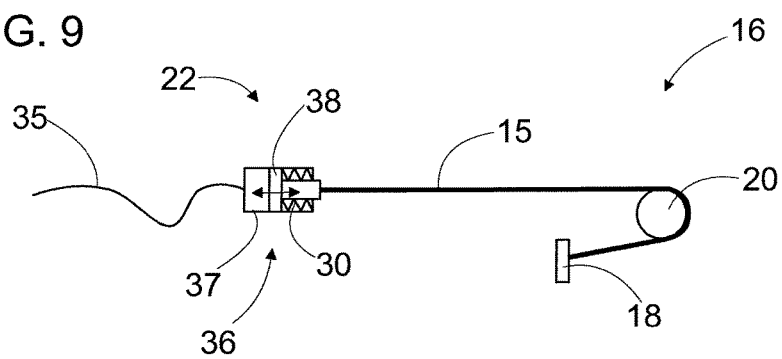
FIG. 10 is a schematic view of a separate coupling component arranged between two hose parts and is provided with two nested parts, which may slide relative to each other in the longitudinal direction and cause desired release effect.

FIG. 10 discloses a separate coupling component 36 arranged between two hose parts 35 and 15. The component 36 is provided with two nested parts 37 and 38, which may slide relative to each other in the longitudinal direction and cause the desired release effect. The component 36 is kept in an initial position by spring element 30.

In FIGS. 9 and 10, the hose support system 16 may be in accordance with solutions shown in FIGS. 1, 3a and 3b and may thus include the disclosed guide rolls 20 and hose clamps 18.

As can be seen in FIGS. 3a, 3b, 6, 9 and 10, the hose 15 is supported at three support points, namely at the ends of the hose and between the ends. The support points at the ends may include the first hose clamp 17 and the second hose clamp 18, and between the hose clamps may be the guide roll 20. Because of the three support points, varying outer dimensions of the hose 15 causes changes in length of the hose.

Although the present embodiment(s) has been described in relation to particular aspects thereof, many other variations and modifications and other uses will become apparent to those skilled in the art. It is preferred therefore, that the present embodiment(s) be limited not by the specific disclosure herein, but only by the appended claims.

The invention claimed is:

1. A hose release device for a pressure medium system comprising:
    a body;
    at least one longitudinal arm protruding from the body;
    at least one support surface for supporting at least one pressure medium hose, the at least one support surface having an initial position and a movement range allowing movement away from the initial position;
    at least one force member generating a support force for maintaining the support surface in the initial position, wherein the support surface is moved away from the initial position when a force is directed to the support surface from the at least one pressure medium hose, the hose release device being a protecting device that allows for a length compensation when a length of the supported pressure medium hose is shortened due to expansion of an outer diameter of the pressure medium hose caused by high pressure prevailing inside the hose; and,
    at least one connecting element disposed at a distal end portion of the at least one longitudinal arm arranged to connect the at least one pressure medium hose to the at least one longitudinal arm, wherein the distal end portion of the at least one longitudinal arm forms a support surface, the at least one longitudinal arm being arranged to bend relative to the body, the bending generating a release effect.

2. The hose release device as claimed in claim 1, wherein the at least one force member is a spring.

3. The hose release device as claimed in claim 1, wherein the support force of the at least one force member is directed in a transverse direction relative a longitudinal axis of the at least one pressure medium hose being supported, whereby the hose release device allows the hose to be moved in the transverse direction and produces a transverse release effect.

4. The hose release device as claimed in claim 1, wherein the longitudinal axis of the at least one longitudinal arm is disposed in an initial angle position relative to the body.

5. The hose release device as claimed in claim 1, wherein the hose release device has a plate-like configuration.

6. A hose arrangement comprising:
    at least one pressure medium hose arranged between a first fastening point and a second fastening point, the at least one pressure medium hose extending around at least one guide roll; and
    at least one hose release device located between the first fastening point and the at least one roll, the at least one hose release device including a body, at least one longitudinal arm protruding from the body, at least one support surface for supporting the at least one pressure medium hose, the at least one support surface having an initial position and a movement range allowing movement away from the initial position, and at least one force member generating a support force for maintaining the support surface in the initial position, wherein the at least one support surface is moved away from the initial position when a force is directed to the at least one support surface from the at least one pressure medium hose, the at least one hose release device being a protecting device that allows for a length compensation when a length of the supported pressure medium hose is shortened due to expansion of an outer diameter of the pressure medium hose caused by high pressure prevailing inside the hose, and at least one connecting element disposed at a distal end portion of the at least one longitudinal arm arranged to connect the at least one pressure medium hose to the at least one longitudinal arm, wherein the distal end portion of the at least one longitudinal arm forms a support surface, the at least one longitudinal arm being arranged to bend relative to the body, the bending generating a release effect, and wherein the at least one hose release device deflects in the initial position the hose in a transverse direction from a shortest line between the first fastening point and the at least one guide roll.

7. A rock drilling unit, comprising:
a feed beam;
a rock drilling machine arranged on the feed beam;
a feed device for moving the rock drilling machine relative to the feed beam;
at least one pressure medium hose hydraulically connected to the rock drilling machine; and
a hose support system including a first hose clamp mounted to the feed beam, a second hose clamp mounted in connection with the rock drilling machine, and at least one guide roll arranged movably at an end portion of the feed beam; and
at least one hose release device located between at least one of the first and second hose clamps and the at least one guide roll, the at least one hose release device including at least one support surface for supporting the at least one pressure medium hose, the at least one support surface having an initial position and a movement range allowing movement away from the initial position, and at least one force member generating a support force for maintaining the support surface in the initial position, wherein the at least one support surface is moved away from the initial position when a force is directed to the at least one support surface from the at least one pressure medium hose, the at least one hose release device being a protecting device that allows for a length compensation when a length of the supported pressure medium hose is shortened due to expansion of an outer diameter of the at least one pressure medium hose caused by high pressure prevailing inside the hose, wherein the at least one hose release device deflects in the initial position the hydraulic hose in a transverse direction from a shortest line between at least one of the first and second hose clamps and the at least one guide roll.

8. The rock drilling rig as claimed in claim 7, wherein the rock drilling machine includes a hydraulic percussion device and at least one pressure medium hose leading to the percussion device is supported by the hose release device.

9. A method of managing pressure medium hoses, the method comprising:
leading at least one pressure medium hose to a rock drilling machine;
supporting the at least one pressure medium hose between at least two supporting objects;
implementing at least one hose release device, the at least one hose release device including a body, at least one longitudinal arm protruding from the body, at least one support surface for supporting the at least one pressure medium hose, the at least one support surface having an initial position and a movement range allowing movement away from the initial position, at least one force member generating a support force for maintaining the support surface in the initial position, wherein the support surface is moved away from the initial position when a force is directed to the support surface from the at least one pressure medium hose, the hose release device being a protecting device that allows for a length compensation when a length of the supported pressure medium hose is shortened due to expansion of an outer diameter of the pressure medium hose caused by high pressure prevailing inside the hose, and at least one connecting element disposed at a distal end portion of the at least one longitudinal arm arranged to connect the at least one pressure medium hose to the at least one longitudinal arm, wherein the distal end portion of the at least one longitudinal arm forms a support surface, the at least one longitudinal arm being arranged to bend relative to the body, the bending generating a release effect;
deflecting the at least one pressure medium hose from a shortest straight line between the supporting objects by the at least hose release device; and
allowing the hose to move towards the straight line when the hose is pressurized and its length is decreased due to the pressurization.

* * * * *